US010943350B2

(12) United States Patent
Ward et al.

(10) Patent No.: US 10,943,350 B2
(45) Date of Patent: Mar. 9, 2021

(54) AUTOMATED SEGMENTATION OF HISTOLOGICAL SECTIONS FOR VASCULATURE QUANTIFICATION

(71) Applicant: LONDON HEALTH SCIENCES CENTRE RESEARCH INC., London (CA)

(72) Inventors: Aaron Devin Ward, London (CA); Yi Wen Xu, London (CA); John Geoffrey Pickering, London (CA)

(73) Assignee: LONDON HEALTH SCIENCE CENTER RESEARCH INC., London (CA)

( * ) Notice: Subject to any disclaimer, the term of this patent is extended or adjusted under 35 U.S.C. 154(b) by 556 days.

(21) Appl. No.: 15/553,842

(22) PCT Filed: Feb. 25, 2016

(86) PCT No.: PCT/CA2016/050194
§ 371 (c)(1),
(2) Date: Oct. 28, 2018

(87) PCT Pub. No.: WO2016/134474
PCT Pub. Date: Sep. 1, 2016

(65) Prior Publication Data
US 2019/0043198 A1   Feb. 7, 2019

Related U.S. Application Data

(60) Provisional application No. 62/120,435, filed on Feb. 25, 2015.

(51) Int. Cl.
*G06T 7/11* (2017.01)
*G06T 7/12* (2017.01)
(Continued)

(52) U.S. Cl.
CPC ............. *G06T 7/11* (2017.01); *G06T 7/12* (2017.01); *G06T 7/136* (2017.01); *G06T 7/181* (2017.01);
(Continued)

(58) Field of Classification Search
CPC . G06T 7/11; G06T 7/136; G06T 7/181; G06T 7/12; G06T 2207/10056
See application file for complete search history.

(56) References Cited

U.S. PATENT DOCUMENTS 7,049,140 B1 * 5/2006 Hallahan ............... A61K 41/00
424/450
2005/0165290 A1 * 7/2005 Kotsianti ............ G06T 7/0012
600/407
(Continued)

FOREIGN PATENT DOCUMENTS

WO     02/076282    10/2002
WO     2014/181123  11/2014

OTHER PUBLICATIONS

Zhang, T.Y. & Suen, C.Y. (1984). A fast parallel algorithm for thinning digital patterns. Communications of the ACM, 27, No. 3, 236-239.
(Continued)

*Primary Examiner* — Santiago Garcia
(74) *Attorney, Agent, or Firm* — Eduardo Krupnik (57) ABSTRACT

A fully automated method for detecting and measuring a target of interest such as vasculature, capable of processing whole slide images and extracting large number of targets of interest per slide. The method includes the steps of: (a) obtaining a digital image of a tissue specimen; (b) using a first set of mathematical algorithms based on objectively-defined criteria to isolate the one or more targets of interest from the slide, thereby detecting the one or more targets of interest; and (c) using a second set of mathematical algo-
(Continued)

rithms based on objectively-defined criteria to construct boundaries around the detected targets of interest and obtain quantitative attributes of these one or more targets throughout the slide, thereby measuring the one or more targets.

19 Claims, 3 Drawing Sheets

(51) Int. Cl.
*G06T 7/181* (2017.01)
*G06T 7/136* (2017.01)

(52) U.S. Cl.
CPC .............. *G06T 2207/10056* (2013.01); *G06T 2207/20044* (2013.01); *G06T 2207/30024* (2013.01); *G06T 2207/30101* (2013.01)

(56) References Cited

U.S. PATENT DOCUMENTS

| | | | | |
|---|---|---|---|---|
| 2011/0004101 A1* | 1/2011 | Yang | ............ | A61B 8/0858 600/443 |
| 2012/0253102 A1* | 10/2012 | Marban | ............ | A61M 25/0068 600/12 |
| 2014/0248210 A1* | 9/2014 | Bradbury | ............ | A61P 35/00 424/1.29 |
| 2015/0078641 A1* | 3/2015 | Tan | ............ | G06T 7/12 382/131 |
| 2015/0287194 A1* | 10/2015 | Schoenmeyer | ........ | G06F 3/0488 382/128 |
| 2015/0317790 A1* | 11/2015 | Choi | ............ | G06T 7/0012 382/128 |
| 2016/0040976 A1* | 2/2016 | Berkeley | ............ | G01N 21/4795 356/479 |
| 2016/0049282 A1* | 2/2016 | Brown | ............ | H01J 49/0004 250/282 |
| 2016/0166229 A1* | 6/2016 | Matthews | ............ | A61B 6/037 600/431 |
| 2017/0071522 A1* | 3/2017 | Parsey | ............ | A61B 5/165 |
| 2017/0120041 A1* | 5/2017 | Wenger | ............ | A61N 1/40 |
| 2017/0276598 A1* | 9/2017 | Ikuyama | ............ | G01N 21/27 |

OTHER PUBLICATIONS

Kuhn, H.W. (1956). Variants of the Hungarian method for assignment problems, Naval Research Logistics Quarterly, 3 (4), 253-258.
Otsu, N. (1979). A thershold selection method from gray-level histograms. IEEE Transactions on Systems, Man, and Cybernetics, SMC-9, No. 1, 62-66.
Jones, S.E, Buchbinder, B.R., and Aharon, I. (2000). Three-Dimensional Mapping of Cortical Thickness Using Laplace's Equation. Human Brain Mapping, 11, 12-35.
International Search Report and Written Opinion for PCT/CA2016/050194, dated Apr. 26, 2016.

* cited by examiner

AUTOMATED SEGMENTATION OF HISTOLOGICAL SECTIONS FOR VASCULATURE QUANTIFICATION

FIELD OF THE INVENTION

The present invention relates to automatic measurement of vascular morphology and density.

BACKGROUND OF THE INVENTION

Vascular restructuring through angiogenesis in the microvasculature is a prominent feature of disease repair in tissues, which can impact tissue perfusion and organ function. To visualize and identify the features of interest, histology is used to depict localized protein expression of vascular components, with staining for specific vessel wall components of interest. Immunohistochemistry is a routine method for the evaluation of localized antigen distributions at high resolutions. An important feature which varies throughout the vasculature is the vessel medial layer comprised of smooth muscle, which varies in thickness along the circulatory system, and can be visualized when staining for α-actin. This distribution of smooth muscle may modulate vascular dilation, and thus the flow rate and tissue perfusion, which is imperative to organ function. Differences in this distribution may be prominent post injury due to ischemic conditions and neovascularization. A robust measurement of vascular features throughout whole tissue sections could enable the routine detection of focal pathologies, furthering our understanding of vascular regeneration.

Assessment of protein distributions based on immunohistochemistry has been performed using manual and semi-automatic methods. Measurement of the number of positively stained structures of interest has enabled capillary density estimation. In the higher order vessels such as arterioles and venules, the vascular morphology is of interest, requiring not only vessel counting but individual vessel measurement. However, morphological characteristics can be challenging to measure manually, and some measurements, such as the varying thickness of the arteriole wall, approach the limits of practicality of manual measurement. Manual measurements are generally taken in a small number of fields of view and extrapolated to the whole slide, potentially introducing error. Several semi-automatic approaches to quantifying histology use global thresholding followed by post processing to remove artefacts. However, global approaches on 2D sections are challenged by within-section staining variability and lack of 3D context to distinguish true artefacts from small features of interest; for microvasculature analysis, the latter limitation is particularly important.

SUMMARY OF THE INVENTION

The present invention provides for an automated segmentation that includes locally adaptive extraction of the target such as boundaries after colour deconvolution, and leverages a highly accurate 3D reconstruction of serial sections to provide 3D context enabling identification of staining artefacts.

In one embodiment, the present invention is an automated method for detecting and measuring one or more targets of interest in tissue stained for said one or more targets. The method, in one embodiment, includes: (a) obtaining a digital image of the tissue stained for the one or more targets of interest; (b) using a first set of mathematical algorithms based on objectively-defined criteria to isolate the one or more targets from the image, thereby detecting the one or more targets; and (c) using a second set of mathematical algorithms based on objectively-defined criteria to construct boundaries around the one or more targets and obtain quantitative attributes of these one or more targets throughout the image, thereby measuring the one or more targets.

In one embodiment of the automated method of the present invention, the one or more targets of interest include one or more tissue components of interest which have been color stained so that the tissue components are distinguishable from other components of the tissue.

In another embodiment of the automated method of the present invention, the one or more targets of interest are blood vessels having a size range of about 10-40 μm, or wherein the one or more targets of interest are cells.

In another embodiment the present invention is a method to automatically detect and measure vasculature in tissue stained for blood vessel walls comprising the steps of: (a) obtaining a digital image of the tissue specimen stained for blood vessel walls; (b) using a first set of mathematical algorithms based on objectively-defined criteria to isolate the blood vessels from the image; and (c) using a second set of mathematical algorithms based on objectively-defined criteria to construct boundaries around each of the blood vessels in the image and to obtain quantitative attributes of blood vessels throughout the image, thereby measuring the vasculature in the tissue image.

In one embodiment of the automated methods of the present invention, the quantitative attributes include density and morphometry.

In another embodiment of the automated methods of the present invention, the methods are operable on a computing device having a processor and memory.

In another embodiment, present invention is a method of computer-assisted detecting and measuring one or more targets of interest in tissue stained for said one or more targets, comprising: (a) extracting features of a digital image of the tissue having stain for the one or more targets of interest thereby detecting the one or more targets of interest present in the tissue image; (b) connecting discontinuous fragments within the detected one or more targets to construct boundaries around each of the targets in the digital image; and (c) using the constructed boundaries to measure quantitative attributes of the one or more targets throughout the digital image.

In one embodiment of the computer-assisted method of the present invention step (a) comprises (i) color deconvolution of the image to extract the features having the stain, (ii) global thresholding to remove background color in the image, and (iii) size thresholding foreground objects according to size.

In another embodiment of the computer-assisted method of the present invention step (b) comprises thinning the discontinuous fragments and connecting the discontinuous fragments to form complete boundaries using a topological skeleton of the one or more targets thereby constructing the boundaries around each of the targets of interest in the image.

In another embodiment of the computer-assisted method of the present invention step (c) includes measuring density of the one or more targets of interest in the tissue and morphological measures of the one or more targets of interest.

In another embodiment of the computer-assisted method of the present invention the one or more targets of interest include one or more tissue components of interest which have been color stained so that the tissue components are distinguishable from other components of the tissue.

In another embodiment of the computer-assisted method of the present invention the one or more targets of interest are the walls of blood vessels having a size range of about 10-40 µm, or wherein the one or more features of interest are cells.

In another embodiment of the computer-assisted method of the present invention the one or more targets of interest are the walls of blood vessels, and wherein step (c) includes measuring vasculature density in the tissue and morphological measures of the blood vessels.

In another embodiment the present invention provides for a non-transitory computer readable media comprising software algorithms of computer-readable code executable on a processor, the algorithms comprising: (a) an algorithm for extracting features in a digital image of tissue stained for a target of interest, thereby detecting the target of interest present in the image; (b) an algorithm for connecting discontinuous fragments within the detected target to create boundaries around the target in the image; and (c) an algorithm for measuring the target in the digital tissue image.

In one embodiment of the non-transitory computer readable media of the present invention the algorithm for extracting the features includes color deconvolution of the digital image, global threshold of the image and size threshold of the digital image.

In another embodiment of the non-transitory computer readable media of the present invention the algorithm for connecting the discontinuous fragments include fragment thinning, skeleton pruning and skeleton endpoint connection.

In another embodiment of the non-transitory computer readable media of the present invention the target of interest includes a tissue component which have been color stained so that the tissue component is distinguishable from other components of the tissue.

In another embodiment of the non-transitory computer readable media of the present invention the target of interest is the wall of blood vessels having a size range of about 10-40 µm, or wherein the target of interest is a cell.

In another embodiment of the non-transitory computer readable media of the present invention the target of interest is the walls of blood vessels, and wherein the algorithm for measuring the target in the digital tissue image includes measuring density of the vasculature in the tissue and morphological measures of blood vessels.

In another embodiment of the non-transitory computer readable media of the present invention the non-transitory computer readable media further includes an algorithm for segmentation refinement, wherein the algorithm for segmentation refinement includes local blood vessel region definition, Otsu's threshold on local region, vessel lumen estimation and post-processing.

In another embodiment of the non-transitory computer readable media of the present invention the algorithm for measuring the target includes density measures and morphological measures.

In aspects of the embodiments of the present invention the digital images are whole slide images.

BRIEF DESCRIPTION OF THE DRAWINGS

The following figures illustrate various aspects and preferred and alternative embodiments of the invention.

FIG. 4. A schematic depicting the tissue scanning process. The tissue sections have been stained and cover slipped on a glass slide (a) and ready to be scanned. The glass slides are placed the scanner rack of the Aperio ScanScope system and imaged under bright field light with objective magnification (b). The image is automatically stored onto the computer system attached to the scanner. The whole slide image files are then copied onto the local work station (c) for processing.

DESCRIPTION OF THE INVENTION

Definitions

Unless defined otherwise, all technical and scientific terms used herein have the same meaning as commonly understood by one of ordinary skill in the art to which this invention belongs. Also, unless indicated otherwise, except within the claims, the use of "or" includes "and" and vice versa. Non-limiting terms are not to be construed as limiting unless expressly stated or the context clearly indicates otherwise (for example "containing", "including", "having" and "comprising" typically indicate "including without limitation"). Examples of limiting terms include "consisting of" and "consisting essentially of". Singular forms including in the claims such as "a", "an" and "the" include the plural reference unless expressly stated otherwise.

Figure 4:
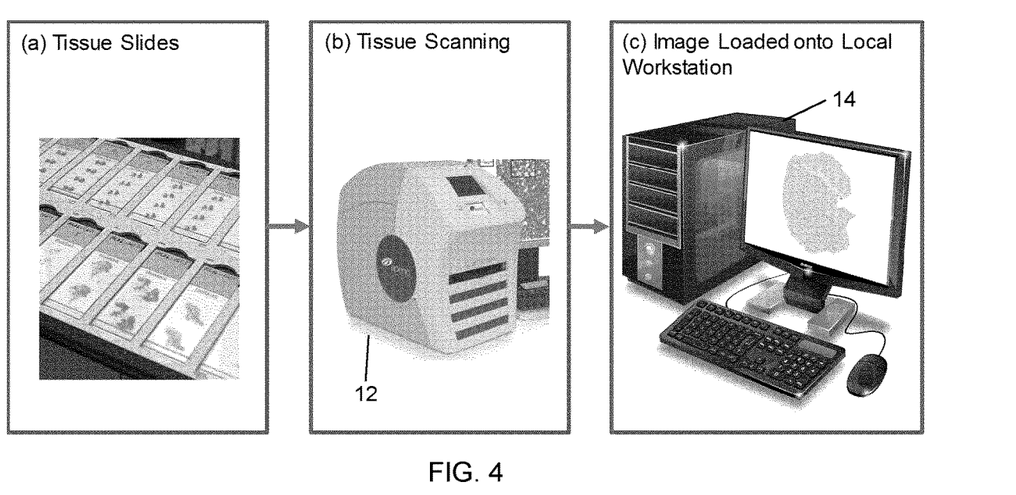

FIG. 4 illustrates a system that may be used with the present invention. The system may include an image acquiring apparatus 12 that acquires image data of a tissue under examination. In the embodiment shown in FIG. 4, the apparatus 12 may be or a scanner 12, such as a bright field scanner. In another embodiment, the apparatus may be a camera coupled to a microscope. The apparatus 12 may acquire raw digital image data from multiple scanned views of the region of interest of the slide. The format of the scanned digital image may be any useful format, for example a single-file pyramidal tiled TIFF, which has the file extension or .svs or .tif. The user or operator may choose to compress the image to JPEG 2000 with the compression type 33003 or 33005 or convert the image to a non-tiled image. The scanning process may be fully automated, the slides may be placed into the scanner and the user or operator may choose the type of scan he/she needs and select start on the software on the attached or coupled workstation 16.

The apparatus may be coupled or attached to a computer or workstation 16. The digital images may be loaded to the computer 16 for processing in accordance to the methods of the present invention as explained herein below.

FIG. 4 illustrates a schematic depicting the tissue scanning process. The tissue sections have been stained for a target of interest, such as blood vessel walls or cells or any target that can be stained so as to be distinguishable from other components of the tissue, and cover slipped on a glass slide (panel (a) of FIG. 4) and ready to be scanned. The glass slides may be placed on the scanner rack of a scanner, such as an Aperio ScanScope system and imaged under bright field light, for example at 40 times objective magnification, but other magnifications more or less than 40 times are possible such as 20 times objective magnification (panel (b) of FIG. 4). The image may be later downsampled to any magnification, for example to a magnification lower than 40 times objective magnification. The image may then be automatically stored onto the computer system attached to the scanner (panel (c) of FIG. 4). The whole slide image files may then be copied onto the local work station (panel (c) of FIG. 4) for processing.

In one embodiment, the present invention is an automated method for detecting and measuring one or more targets of interest in tissue stained for said one or more targets. The method, in one embodiment, includes: (a) obtaining a digital image of the tissue stained for the one or more targets of interest; (b) using a first set of mathematical algorithms based on objectively-defined criteria to isolate the one or more targets from the slide, thereby detecting the one or more targets; and (c) using a second set of mathematical algorithms based on objectively-defined criteria to construct boundaries around the one or more targets and obtain quantitative attributes of these one or more targets throughout the image, thereby measuring the one or more targets.

In another embodiment, the present invention is a method to automatically detect and measure vasculature in a tissue stained for blood vessel walls comprising the steps of: (a) obtaining a digital image of the tissue specimen stained for blood vessel walls; (b) using a first set of mathematical algorithms based on objectively-defined criteria to isolate the blood vessels from the image; and (c) using a second set of mathematical algorithms based on objectively-defined criteria to construct boundaries around each of the blood vessels in the image and to obtain quantitative attributes of blood vessels throughout the image, thereby measuring the vasculature in the tissue image.

Figure 5:
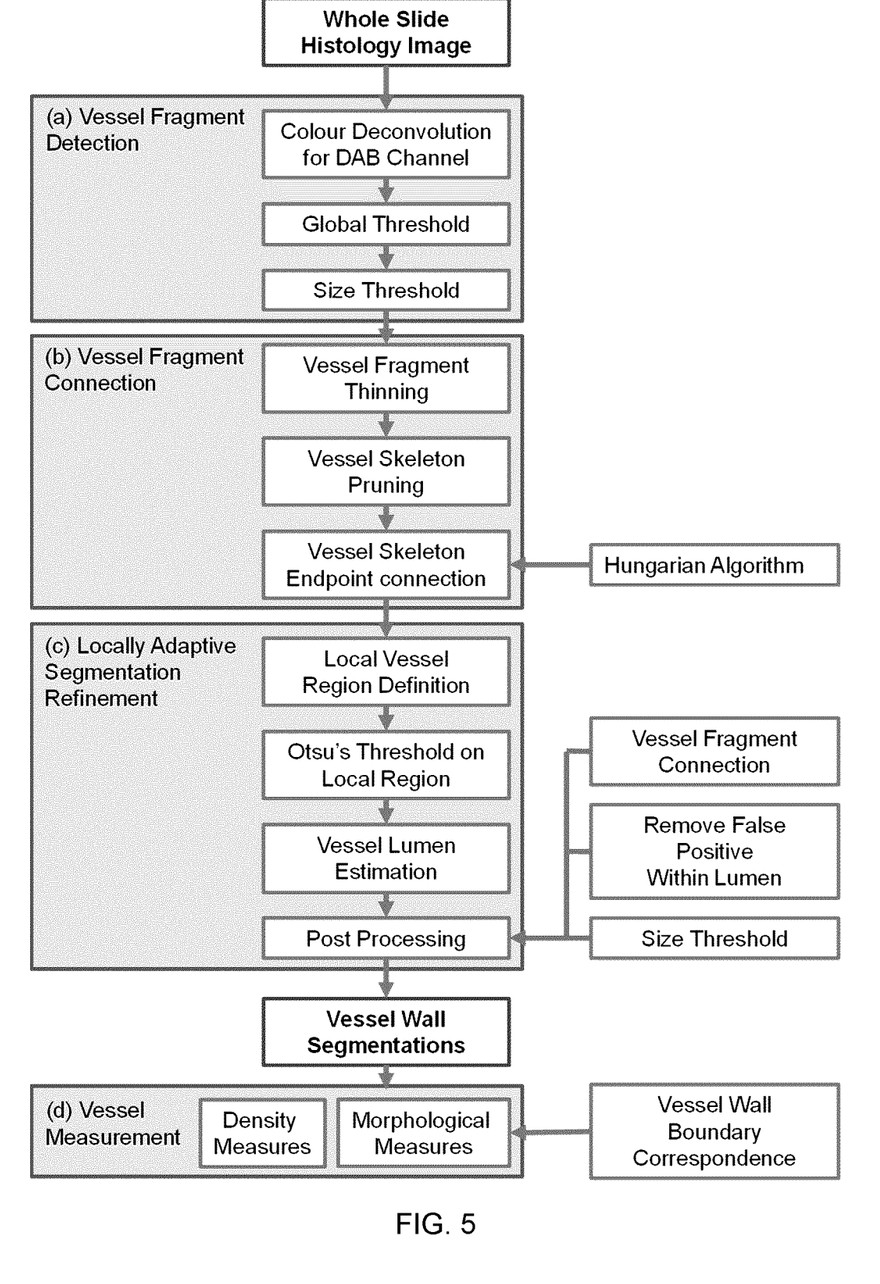
FIG. 5. A block diagram depicting each step in the automated vessel segmentation algorithm starting with whole slide histology images and resulting in vessel wall contours and measurements.

FIG. 5 is a block diagram of one embodiment of the method of the present invention. Although FIG. 5 refers to blood vessels, it should be understood that other targets such as cells stained so that can be differentiated from other tissue components are possible. The method shown in FIG. 5, which may be computer-assisted, of detecting and measuring vasculature in an image of tissue stained for blood vessel walls, may include: (a) extracting features in the image having blood vessel wall stain thereby detecting fragments of blood vessel walls present in the tissue image; (b) connecting the detected fragments thereby constructing boundaries around each of the blood vessels in the image, thereby obtaining the vasculature of the image; and (c) using the constructed boundaries to measure the vasculature in the image.

Quantitative attributes that may be measured with the methods and systems of the present invention include density and morphometry. The density is the detected features of interest per tissue section area, for example the number of vessels detected per whole slide tissue section area. The morphometry of the detected features may include the feature (blood vessel wall) area, perimeter and thickness.

In order to aid in the understanding and preparation of the within invention, the following illustrative, non-limiting, examples are provided.

EXAMPLE

Materials

The experiments were conducted on normal and regenerated vasculature of the mouse hind limb. The tibialis anterior (TA) muscle bundle was used from a wild type C57BL/J6 mouse (Sample 1 and Sample 2), and a mouse of the same strain two weeks after induction of hind limb ischemia by femoral artery excision (Sample 3). Sample 1, Sample 2 and Sample 3 comprised 10, 9, and 12 serial sections, respectively. 3 normal and 3 regenerated separate C57BL/J6 mouse whole hind limb was used for validation of the segmentation and vessel measurements (n=110 manual delineated vessels). The mice were perfused with saline postmortem to remove red blood cells from vessel lumina and then perfusion-fixed at physiological pressure with 4% paraformaldehyde. The tissues were processed and paraffin-embedded, and then cut into 7×5 mm blocks and sectioned at 5 μm.

The tissues can be sectioned from about 2 to about 10 μm for bright field microscopy (2, 3, 4, 5, 6, 7, 8, 9 or 10 μm). However, other thicknesses below 2 μm or above 10 μm may be possible.

Histology tissues sections are immunostained for smooth muscle (SM) α-actin, which marks the smooth muscle layer of arterioles and venules (brown stain) using the monoclonal antibody DAKO, M0851, and bound primary antibody detected with horseradish peroxidase (HRP)-conjugated secondary antibody and 3,3' 3,3'-Diaminobenzidine chromogen (DAB, Vector Laboratories, SK-4100). The tissue was then counter stained with hematoxylin for nuclei (blue stain).

The methods of the present invention will work with types of stain which differentially stains for blood vessels. One non-limiting example may be Fast-Red, which stains the targeted feature of interest red.

The sections were imaged with a ScanScope CS (Aperio Technologies, Vista, Calif., USA) bright field slide scanner, at 20× objective with 2× magnification engaged, resulting in 0.25 μm isotropic pixels.

Vessel Component Localization or Detection (FIG. 5, (a))

Vessel component localization was performed using colour deconvolution, to extract the features with brown stain (stained with DAB) into a single channel, which was thresholded (0.5/1 for the wild type and 0.7/1 for the regenerated mouse) yielding binary images. Positive foreground objects not in the region of the tissue were removed. The tissue section region was defined by downsampling the grayscaled slide image to 4 μm isotropic pixel size, thresholding to remove the white slide background, and performing morphological operations to close any gaps in the skeletal muscle of the TA bundle.

After thresholding, foreground objects were filtered according to size. Any object smaller than half the approximate size of a nucleus (5 μm in diameter or 19.6 μm$^2$) was removed from the foreground. Blue nuclei within the vessel walls can cause holes in the DAB channel; any holes smaller than the approximate size of a nucleus (5 µm in diameter or 19.6 µm²) were therefore filled.

Vessel Fragment Connection (FIG. 5 (*b*))

Figure 1:
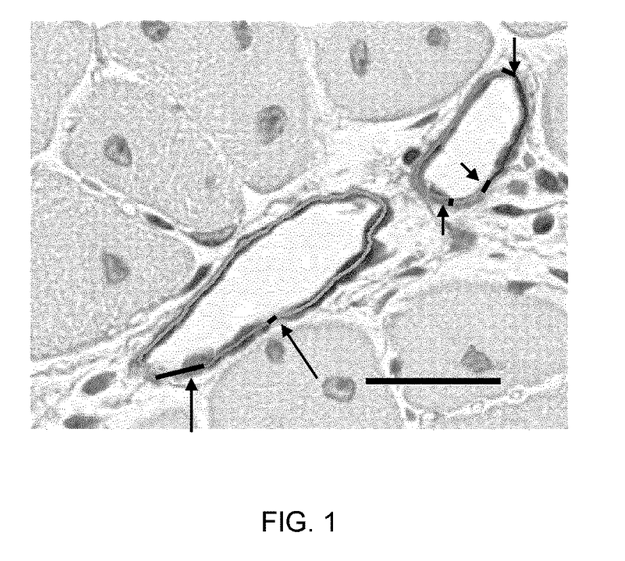
FIG. 1. Microphotograph illustrating blood vessels stained for smooth muscle (SM) α-actin, which marks the SM layer of the vasculature (seen as brown stain), and counter stained with hematoxylin for nuclei (seen as blue stain). Vessel components disconnected by inconsistent staining along the vessel wall are joined with black lines (arrow) using the topological skeletons of each vessel segment (colour centerlines). Scale bar 25 µm.

Vessels with relatively weak staining in portions of the vessel wall were fragmented by the global threshold, which caused disconnections in the smooth muscle boundary. The discontinuous vessel fragments were connected to form complete vessel walls (FIG. 1) using the topological skeletons computed by thinning the vessel fragments [1]. As topological thinning is known to produce spurious branches, pruning was performed to yield skeletons with no branch points. The selected pruned skeleton was defined as $$S = \underset{S_i \in \{S_E, S_G\}}{\operatorname{argmax}} DSC(R(S_i), F)$$

where S_E and S_G are the pruned skeletons with the longest Euclidean and geodesic distances between their endpoints, respectively; R is a function that produces a binary image of an object by reconstruction from its skeleton; F is the binary image of the vessel fragment prior to skeletonization; and DSC is the Dice similarity coefficient. Intuitively, of the two pruned skeletons, this approach chooses the one yielding the highest fidelity reconstruction of the vessel fragment. Endpoint pairs separated by ≤25 µm and having intersecting rays were considered as candidates for connection. Among these candidates, the optimal assignment was determined by solving the resulting bipartite graph matching problem using the Hungarian algorithm [2] minimizing the Euclidean distances between the endpoint pairs. A bounding box B was defined around each resulting connected curve skeleton, within which locally adaptive segmentation refinement was performed.

Locally Adaptive Segmentation Refinement (FIG. 5 (*c*))

To compensate for staining variation within the tissue sections, adaptive thresholding was performed on each vessel using Otsu's method [3] on the DAB channel within a bounding box 3× the area of B. Components of the resulting segmentation overlapping with the vessel wall skeleton were defined as the candidate binary vessel object, enclosed within bounding box $B_o$. A dilated outer vessel boundary convex hull C from the vessel connection stage was created with the same dimensions as B. If the outer vessel boundary of the Otsu segmentation lies outside of C, then the Otsu segmentation was retained; otherwise it was discarded and the original global segmentation was used. This step was intended as a failsafe in cases of local overstaining of surrounding tissue. The outline of the outer vessel boundary is trivially defined as the outer boundary of the segmented vessel. To determine the outline of the inner vessel boundary, the topological skeleton of the filled vessel was computed [1] and pruned to the curve skeleton having the longest Euclidean distance between its endpoints. For vessels having an open lumen, the inner vessel boundary was defined as the boundary of the open lumen region that was connected to the skeleton. For collapsed vessels having no open lumen, the pruned skeleton itself was taken to be the locus of the lumen. In cases where the Otsu segmentation did not yield a fully connected vessel cross section, connectivity was established via the skeleton but vessel measurements were not taken in regions connected only by the skeleton.

Post Processing

The following post processing steps eliminate false positives and smooth the boundary of the vessel walls. Objects smaller than twice the approximate size of a nucleus (5 µm in diameter or 19.6 µm²) were removed to eliminate false positive cells which express actin in the regenerated tissues. False positively stained tissue fragments lying within vessel lumina were also removed. To yield smooth final boundaries, a spline was fit to the inner and outer wall boundaries.

Vessel Measurements (FIG. 5 (*d*))

Measures of the vessel count and density, and vessel wall area, perimeter, and thickness were calculated for each segmented vessel. The area was defined as the area of positively stained tissue, and the perimeter was the geodesic distance around the outer vessel boundary. Thickness was measured locally (every 0.25 µm) along the outer vessel wall perimeter as the Euclidean distance between point pairs along inner and outer vessel wall boundaries corresponded using streamlines of the gradient of the solution to the Laplace equation [4]. The number of positive vessels on each section was measured as a surrogate for vessel count. The density of the vasculature was measured as a ratio of positive vessel area over the area of the tissue section. The total area of the tissue section was acquired by downsampling the grayscaled slide image to 4 µm isotropic pixel size, thresholding to remove the white slide background, and performing morphological operations to close any gaps in the skeletal muscle of the TA bundle.

Evaluation

Vessel walls on a set of histology images stained with the same technique from 3 separate control mice and 3 separate regenerated mice were manually contoured (n=110) for validation. The manual and automated segmentations were compared using the Dice similarity coefficient (DSC), mean absolute boundary distance (MAD), precision, sensitivity and specificity. Area, perimeter, and thickness were also measured on the manual contours for comparison to the automatic measurements.

Statistical Analysis

Kolmogorov-Smirnov normality tests were performed using MATLAB for all measures. The null hypothesis was that the median area, perimeter and thickness values were the same for the three tissue samples. For the thickness measures, these tests were repeated for the 5th and 95th percentile measures to test these extrema for the presence of local thinning or thickening of vessels. Testing was performed using the non-parametric Wilcoxon sign rank test with a Bonferroni-corrected significance level of α/n, where n is the number of sections, in order to compensate for the potential correlation of vessel measures within each tissue sample. In addition, the median measured area, perimeter, and thickness of the manually delineated set of contours were compared to the measures on the automated segmentations using the sign rank test for paired non-normal distributions.

Results

Figure 2:
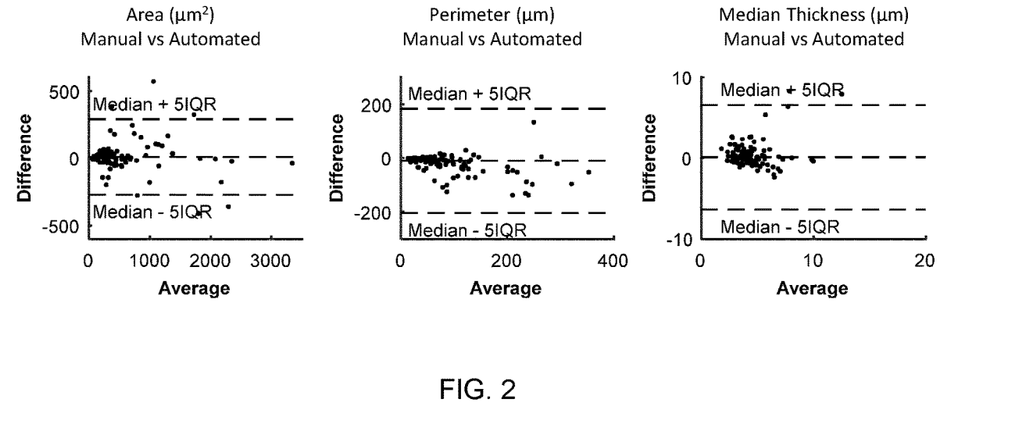
FIG. 2. Bland-Altman plots depicting the differences between the area, perimeter and thickness measurements derived from manual and automated segmentations. Difference: (manual−automated segmentation measure), Average: (manual+automated segmentation measure)/2.
Figure 3:
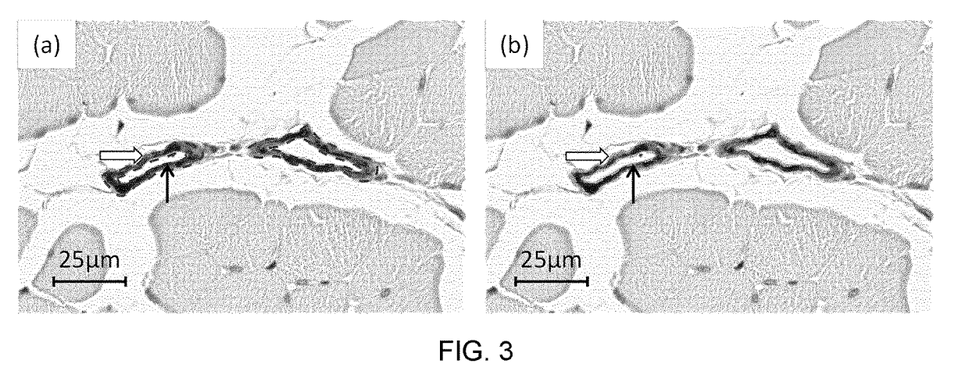
FIG. 3. Microphotograph illustrating contours of automatically segmented (panel "a") and manually delineated (panel "b") vessel walls in the wild type mouse hind limb stained with DAB for α-actin smooth muscle. The dashed lines indicate the inner lumen wall contour (filled arrow) and the outer vessel wall contour (open arrow). Scale bar 25 µm.

Table 1 shows the segmentation validation measures, indicating good concordance between the manual and automated segmentation methods. The measures were found to be non-normally distributed (p<0.05); thus, the median and interquartile range (IQR) were reported. Comparing the manual and automatic segmentations, no statistical difference was found in the area or thickness measures (p>0.1), but a statistical difference was found between the perimeter measures (p<0.05). The manual contours yielded systematically smaller perimeter (FIG. 2). Examples of manual and automated vessel segmentations are shown in FIG. 3.

TABLE 1

Segmentation validation measures.

| Measure (n = 110) | Median | IQR |
|---|---|---|
| Mean absolute distance (μm) | 0.48 | 0.39 |
| Dice similarity coefficient | 0.88 | 0.07 |
| Sensitivity | 0.88 | 0.10 |
| Specificity | 0.96 | 0.06 |
| Precision | 0.92 | 0.11 |

Descriptive statistics on vessel density and count are shown in Table 2. There was a significant difference in median vessel count per section area and media area per section area between the normal (samples 2 and 3) and the regenerated (sample 3) vessel distributions (p<0.05). Sample 3 (regenerated) had greater median vessel count per section area and media area per section area (Table 2) than samples 1 and 2 (normal).

TABLE 2

Descriptive statistics of vessel count and density

| | Vessel Count/Section Area (mm$^{-2}$) | | Media Area/Section Area (μm$^2$/μm$^2$) | |
|---|---|---|---|---|
| | Median | IQR | Median | IQR |
| Sample 1 (n = 10) | 5.38 | 0.70 | 0.0035 | 0.0008 |
| Sample 2 (n = 9) | 5.31 | 2.03 | 0.0028 | 0.0004 |
| Sample 3 (n = 12) | 30.95 | 1.54 | 0.0072 | 0.0012 |

The morphological measures on the automated segmentation of the normal and regenerated mouse hind limb muscles resulted in non-normal distributions of area, perimeter and thickness values, which are shown in Table 3 and Table 4. Bonferroni correction was performed, using a significance level of α=0.05/12=0.004 (sample 3 had the largest number of serial sections at 12). No significant difference was found between the two normal samples (sample 1 and 2). A significant difference in area was found between sample 1 and sample 3 (p<0.001). There were significant differences for all thickness (5$^{th}$, 50$^{th}$ and 95$^{th}$ percentile) and perimeter measures (p<0.002), except for between samples 1 and 2 (both normal). There was no significant difference between any of the samples with regards to the within vessel wall thickness variance.

TABLE 3

Automatic measurements of vessel smooth muscle layer area and perimeter

| | Area (μm$^2$) | | Perimeter (μm) | |
|---|---|---|---|---|
| | Median | IQR | Median | IQR |
| Sample 1 (n = 743) | 132.44 | 225.59 | 27.03 | 37.35 |
| Sample 2 (n = 694) | 115.25 | 206.63 | 26.88 | 32.11 |
| Sample 3 (n = 1831) | 110.00 | 148.83 | 32.52 | 35.76 |

TABLE 4

Automatic measurements of vessel smooth muscle layer thickness

| | Thickness (μm) | | | | | | | |
|---|---|---|---|---|---|---|---|---|
| | 5th Percentile | | 50th Percentile | | 95th Percentile | | Within-Vessel Variance | |
| | Median | IQR | Median | IQR | Median | IQR | Median | IQR |
| Sample 1 (n = 743) | 2.00 | 1.60 | 3.58 | 2.54 | 6.37 | 5.13 | 6.20 | 14.91 |
| Sample 2 (n = 694) | 1.80 | 1.49 | 3.49 | 2.49 | 6.15 | 4.47 | 5.48 | 12.59 |
| Sample 3 (n = 1831) | 1.46 | 1.35 | 2.93 | 1.52 | 5.28 | 4.41 | 5.41 | 14.24 |

The automatic vessel segmentation algorithm detected, delineated, and measured a total of 3,268 vessel cross sections on the 31 whole-slide images used in this study. Manual delineation and quantification of vasculature on this scale is clearly impractical, and this technique paves the way for high-throughput, fully automatic vasculature quantification in mouse models. These measures of vascular morphology and density could lead to complete, accurate, and repeatable description of smooth muscle variability of tissues in states of disease or recovery.

CONCLUSION

Segmentation and quantification of microvasculature stained with α-actin immunostain on digital histology of mouse hind-limb tissue was performed automatically using an approach involving localization of vessel components on whole section images. Excellent concordance with manual measurements was found.

ADVANTAGES

This invention provides a valuable tool for scientists requiring high-throughput vascular segmentations and morphological measures for the analysis of vasculature for disease state comparisons or for quantitative measurements of any other target of interest in tissue stained for said target of interest. This invention takes the form of a software module that can be readily integrated as a "plug-in" into a scientist's image viewing workstation provided sufficient access to the workstation software's application programming interface. The methods of the present invention performs both detection and delineation of a target of interest, such as vessels. Images having around 200-300 vessels may be used with the methods of the present invention. The method of the present invention may detect all, or substantially all of the targets such as vessels, delineates all of them, and computes valuable measurements (in the case of blood vessels perimeter, vessel wall area, and vessel wall thickness) of all or substantially all of them.

This invention presents a fully automated method for segmenting and measuring microvasculature, capable of processing whole slide images and extracting hundreds of vessels per slide, eliminating the need for tedious manual measurements subject to operator variability. The method of the present invention shows excellent concordance with manual measurements and detects vasculature differences between wild type and regenerated post-ischemic samples of mouse hind limb tissues.

The present invention has the following novel and unusual advantages:

The automatic vessel segmentation algorithm can detect, delineate, and measure thousands of vessel cross sections on whole-slide images, which paves the way for high-throughput, fully automatic vasculature quantification in mouse models. This is different from the conventional analysis performed on microscope images with small fields of view and manual delineation, where under sampling could lead to a bias in the resulting measures.

The present invention measures vascular morphology and density which could lead to complete, accurate, and repeatable description of smooth muscle variability of tissues in states of disease or recovery at high resolutions (0.25 µm). This is different from the conventional analysis performed where manual contours of whole slide images are time consuming and may contain operator variability.

The method of the present invention has excellent concordance with manual measurements and detected vasculature differences between wild type and regenerated post-ischemic samples of mouse hind limb tissues. So far differences between two mouse models have been shown, but this invention could be applied to or extended to other disease or animal models for comparison.

The method of the present invention may be used to obtain automated segmentation of a target of interest such as a cell or vessel walls, including large vessels, such as arteries, as well as small vessels, such as arterioles. The method of the present invention has been successfully use to study mouse arterioles having sizes in the range of about 10-40 microns (10, 15, 20, 25, 30, 35, 40 microns) but may be applied to other target of interest such as cells or other tissue components.

Although the above discussion and examples concentrate on the application of the present invention in a vascular scenario, a person skilled in the art would comprehend these and other alternative implementations of the present invention as a natural extension of the present invention.

REFERENCES

[1] T. Y. Zhang, and C. Y. Suen. "A fast parallel algorithm for thinning digital patterns." Communications of the ACM, 27(3), 236-239(1984).

[2] H. W. Kuhn, "Variants of the Hungarian method for assignment problems," Naval Research Logistics Quarterly, 3(4), 253-258 (1956).

[3] N. Otsu, "A threshold selection method from gray-level histogram," IEEE Transactions on Systems, Man and Cybernetics, 9(1), 62-66 (1979).

[4] S. E. Jones, B. R. Buchbinder, and I. Aharon, "Three-dimensional mapping of cortical thickness using Laplace's Equation," Human brain mapping, 11(1), 12-32 (2000).

As many changes can be made to the embodiments described above without departing from the scope of the invention, it is intended that all material contained herein be interpreted as illustrative of the invention and not in a limiting sense. All citations are incorporated herein by reference in their entirety. Changes in form and substitution of equivalents are contemplated as circumstances may suggest or render expedient. Although specific terms have been employed herein, such terms are intended in a descriptive sense and not for purposes of limitation.

Future applications claiming priority to this application may or may not include the following claims, and may include claims broader, narrower, or entirely different from the following claims.

What is claimed is:

1. An automated method for detecting, segmenting and measuring one or more biological targets of interest within histological sections of tissue color stained for said one or more biological targets of interest with a stain of interest, the method comprising: (a) obtaining a digital image of the histological sections of tissue stained for the one or more biological targets of interest and localizing the one or more biological targets based on said stain thereby detecting the one or more biological targets of interest within the histological sections of tissue; (b) using a first set of mathematical algorithms based on objectively-defined criteria to isolate each of the one or more biological targets from the image, thereby segmenting each one of the detected one or more biological targets within the histological sections of tissue; and (c) using a second set of mathematical algorithms based on objectively-defined criteria construct boundaries around each of the segmented one or more biological targets and obtain quantitative attributes of each of the one or more biological targets throughout the image, thereby measuring the one or more biological targets within the histological sections of tissue.

2. The method of claim 1, wherein the one or more biological targets of interest include one or more tissue components of interest which have been color stained so that the tissue components are distinguishable from other components of the tissue.

3. The method of claim 1, wherein the one or more biological targets of interest are blood vessels having a size range of about 10-40 µm, or wherein the one or more targets of interest are cells.

4. The method of claim 1, wherein the one or more biological targets is vasculature in a tissue stained for blood vessel walls.

5. The method of claim 1, wherein the quantitative attributes include density and morphometry.

6. The method of claim 1, wherein the method is operable on a computing device having a processor and memory.

7. A method of computer-assisted detecting and measuring one or more biological targets of interest in a histological section of tissue color stained for said one or more biological targets, comprising:
(a) extracting features of a digital microscopic image of the histological section of the tissue having the color stain for the one or more biological targets of interest thereby detecting the one or more biological targets of interest present in the digital microscopic image of the tissue;
(b) fragmenting targets of interest having relatively weak staining portions, thereby obtaining discontinuous fragments;
(c) connecting the discontinuous fragments within the detected one or more biological targets to construct boundaries around each of the targets in the digital microscopic image, said connecting comprises thinning the discontinuous fragments and connecting the discontinuous fragments to form complete boundaries using a topological skeleton of the one or more biological targets thereby constructing the boundaries around each of the one or more biological targets of interest in the image; and (d) using the constructed boundaries to measure quantitative attributes of the one or more biological targets of interest throughout the digital microscopic image.

8. The method of claim 7, wherein step (a) comprises (i) color deconvolution of the image to extract the features having the stain, (ii) global thresholding to remove background color in the image, and (iii) size thresholding foreground objects according to size.

9. The method of claim 7, wherein step (c) includes measuring density of the one or more targets of interest in the tissue and morphological measures of the one or more biological targets of interest.

10. The method of claim 7, wherein the one or more biological targets of interest include one or more tissue components of interest which have been color stained so that the tissue components are distinguishable from other components of the tissue.

11. The method of claim 7, wherein the one or more biological targets of interest are the walls of blood vessels having a size range of about 10-40 μm, or wherein the one or more features of interest are cells.

12. The method of claim 7, wherein the one or more biological targets of interest are the walls of blood vessels, and wherein step (c) includes measuring density of the vasculature in the tissue and morphological measures of the blood vessels.

13. A non-transitory computer readable media comprising software algorithms of computer-readable code executable on a processor, the algorithms comprising:

(a) an algorithm based on objectively-defined criteria for extracting features in a digital microscopic image of tissue color stained for one or more biological targets of interest, thereby detecting the one or more biological targets of interest within the tissue present in the digital microscopic image;

(b) an algorithm for fragmenting the one or more biological targets of interest having relatively weak staining portions, thereby obtaining discontinuous fragments, (c) an algorithm based on objectively-defined criteria for connecting discontinuous fragments within the detected one or more biological targets to create boundaries around the one or more biological targets of interest in the digital microscopic image, wherein the algorithm for connecting the discontinuous fragments include fragment thinning, skeleton pruning and skeleton endpoint connection; and (d) an algorithm for measuring the one or more biological targets of interest in the digital microscopic tissue image.

14. The non-transitory computer readable media of claim 13, wherein the algorithm for extracting the features includes color deconvolution of the digital image, global threshold of the image and size threshold of the digital image.

15. The non-transitory computer readable media of claim 13, wherein the one or more biological targets of interest includes a tissue component which have been color stained so that the tissue component is distinguishable from other components of the tissue.

16. The non-transitory computer readable media of claim 13, wherein the one or more biological targets of interest is the wall of blood vessels having a size range of about 10-40 μm, or wherein the target of interest is a cell.

17. The non-transitory computer readable media of claim 13, wherein the one or more biological targets of interest is the walls of blood vessels, and wherein the algorithm for measuring the one or more biological targets in the digital microscopic tissue image includes measuring density of the vasculature in the tissue and morphological measures of blood vessels.

18. The non-transitory computer readable media of claim 17, wherein the non-transitory computer readable media further includes an algorithm for segmentation refinement, wherein the algorithm for segmentation refinement includes local blood vessel region definition, Otsu's threshold on local region, vessel lumen estimation and post-processing.

19. The non-transitory computer readable media of claim 13, wherein the algorithm for measuring the one or more biological targets includes density measures and morphological measures.

* * * * *